United States Patent Office 3,509,186
Patented Apr. 28, 1970

3,509,186
ORGANOTIN PHENOLATES
Toshio Seki, Osaka-shi, Kozaburo Suzuki, Kobe-shi, and Takashi Matsuzaki, Osaka-shi, Japan, assignors to Nitto Kasei Co., Ltd., Osaka, Japan, a corporation of Japan
No Drawing. Filed Sept. 15, 1966, Ser. No. 579,484
Claims priority, application Japan, Sept. 17, 1965, 40/56,652
Int. Cl. C07f 7/22
U.S. Cl. 260—402.5         13 Claims

ABSTRACT OF THE DISCLOSURE

New compounds are provided of the formula:
(I)         $[R_mSn]_a [X]_b [Y]_c$
wherein:
(a) R is selected from the group consisting of alkyl of 1–18 carbon atoms, cycloalkyl, aryl, and benzyl;
(b) m, a, and b are each an integer 1–3, c is an integer 0–2;
(c) Y is selected from the group consisting of the residue of a carboxylic acid of 1–18 carbon atoms, mercaptan, mercapto acid ester, monoester maleate, a hydroxyl group, an oxygen atom in which c is 1, and a sulfur atom in which c is 1; and
(d) X is a residue of a compound of the formula:

(II)
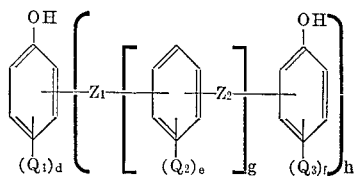

wherein:
(1) $Q_1$, $Q_2$, and $Q_3$ may be the same or different and are each selected from the group consisting of hydroxyl, alkyl of 1–12 carbon atoms, methoxy,

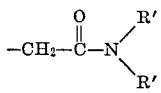

wherein R' is alkyl of 1–18 carbon atoms, —NHCOR' wherein R' is as defined above, and —$CH_2CH_2COOR'$ wherein R' is as defined above (in which said hydroxyl groups may be attached to the tin atom via the hydroxyl-oxygen atom by removal of the hydrogen atom from said group), at least one of each of $Q_1$ and $Q_3$ being attached in the ortho position to the respective phenolic hydroxyls when $Q_1$ and $Q_3$ are alkyl of 1–12 carbon atoms;
(2) d, e, and f are each an integer 1–3, g is an integer 0–3, h is an integer 0–1;
(3) each of $Z_1$ and $Z_2$ is independently selected from the group consisting of sulfur, oxygen, and alkylene of 1–4 carbon atoms;
(4) when d, e, and f are each 2 or 3, each of $Q_1$, $Q_2$, and $Q_3$ may be the same or different; and
(5) all unsubstituted valences of the atoms in Formula (II) are bonded to hydrogen atoms. These organotin compounds find utility as stabilizers for synthetic resins.

---

This invention relates to novel organotin compounds, to the preparation of such compounds, and to synthetic resins stabilized with said organotin compounds.

It is known that certain organic compounds may be added as antioxidants to such synthetic resins as stated in Modern Plastics Encyclopedia Issue for 1965, volume 42, No. 1A, pages 113–271, for example, ABS (acrylonitrile-butadiene-styrene) resins, cellulose plastics, acetal resins, fluoro-plastics, acrylic resins, chlorinated polyethers, alkyd resins, amino resins, urethane resins, epoxy resins, polyamide resins, phenoxy resins, furan resins, phenol resins, polyimides, polycarbonates, unsaturated polyesters, polyethylene, polypropylene, polystyrene, polyvinyl chlorides, synthetic rubbers, etc. which are all subject to oxidative degradation.

Certain of these antioxidants may be characterized by unsatisfactory stabilizing ability because of thermal decomposition, volatilization by heat, and sublimation during the process of producing films, fibers, or other molded articles which are heated. These phenomenon become even more pronounced when the synthetic resins are processed at a temperature above 180° C. In addition, when these known stabilizers are added to fibers, which are to be washed or drycleaned, a decrease of stabilizing ability by wash and considerable discoloration due to the reaction of extremely small quantities of metal ion or cleaning material with the stabilizers may often be observed. Accordingly, while antioxidants impart chemically stabilizing ability to synthetic resins, they should bear their own good thermal stability, less sublimation, and other chemical stability.

According to the present invention, these adverse effects may be reduced or eliminated by employing a new class of organotin compounds as stabilizers.

It is an object of this invention to provide novel organotin compounds and method of producing such compounds. A further object of this invention is to provide synthetic resins stabilized with one or more of these novel organotin compounds. Other objects will be apparent to those skilled-in-the-art from the following description.

In accordance with certain of its aspects, the method of this invention for stabilizing synthetic resins against oxidative degradation comprises incorporating into said resin an inhibiting amount of a compound having the following formula
(I)         $[R_mSn]_a [X]_b [Y]_c$
wherein:
(a) R is selected from the group consisting of alkyl of 1–18 carbon atoms, cycloalkyl, aryl, and benzyl,
(b) m, a, and b are each an integer 1–3, c is an integer 0–2,
(c) Y is selected from the group consisting of carboxylic acid of 1–18 carbon atoms, mercaptan, monovalent mercapto acid ester formed by removal of the hydrogen atom from the mercaptan portion of the ester molecule, monovalent monoester maleate residues formed by removal of the hydrogen atom from the carboxyl of said maleate monoester, hydroxyl group, oxygen and sulfur atoms, and
(d) X is a residue of a compound of the formula (II)
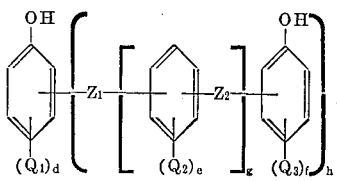

wherein:
(1) $Q_1$, $Q_2$, and $Q_3$ may be the same or different and are each selected from the group consisting of hydroxyl, alkyl of 1–12 carbon atoms, alkoxy,

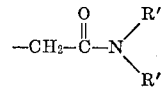

wherein R' is alkyl of 1–18 carbon atoms, —NHCOR' wherein R' is as defined above, and —$CH_2CH_2COOR'$ wherein R' is as defined above (in which said hydroxyl groups may be attached to the tin atom via the hydroxyl-oxygen atom by removal of the hydrogen atom from said group), (2) $d$, $e$, and $f$ are each an integer 1–3, $g$ is an integer 0–3, $h$ is an integer 0–1, (3) each of $Z_1$ and $Z_2$ is independently selected from the group consisting of sulfur, oxygen, and alkylene of 1–4 carbon atoms, (4) when $d$, $e$, and $f$ are each 2 or 3, each of $Q_1$, $Q_2$, and $Q_3$ may be the same or different, and (5) all unsubstituted valences of the atoms in Formula II are bonded to hydrogen atoms.

Examples of suitable X residue include the residues 2,6-di-t-butyl-4-methyl phenol,
2,6-di-t-butyl-4-butyl phenol,
2,6-di-t-amyl-4-methyl phenol,
2,6-di-t-butyl-4-ethyl phenol,
2,4-di-isooctyl phenol,
2-methoxy-6-ethyl phenol,
2,2′-methylene bis(4-methyl-6-butyl phenol),
4,4′-methylene-bis(2,6-di-isopropyl phenol),
4,4′-thio bis(2-t-butyl-5-methyl phenol),
2,2′-thio bis(6-t-butyl-4methyl phenol),
N,N-di-(n-dodecyl)-3,5-di-t-butyl-4-hydroxyphenyl acetoamide

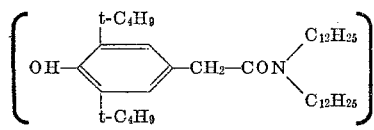

N-stearoyl-p-aminophenol

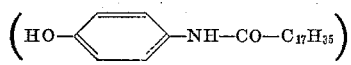

and octyl α-3,5-di-t-butyl-4-hydroxyphenyl propionate

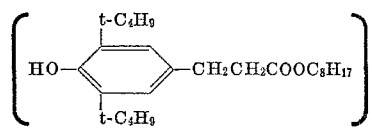

Example of suitable Y residue include the residues of stearic acid, lauric acid, monobenzyl maleate, monobutyl maleate, dodecyl mercaptan, octyl thioglycollate, and benzyl propionate mercaptan.

The organotin compounds having the aforesaid general Formula I may be prepared by heating a compound of which X is the residue wherein X has the same significance as described for the foregoing general Formula I, or boric acid ester thereof with a member selected from the group consisting of a bis-triorganotin oxide, a triorganotin hydroxide, a diorganotin oxide, and a mono-organotin oxide in an inert solvent medium such as benzene, toluene, etc. Instead of the organotin oxides, tri-, di-, or mono-organotin alkoxides (or sulfides) may be employed in the reaction. Other compounds within the general Formula I may be prepared by heating a compound of which X is the residue wherein X has the same significance as described for the foregoing general Formula I, or boric acid ester thereof with an organotin oxide, or a tri-, di-, or mono-organotin alkoxide (or sulfide) in the presence of a carboxylic acid, mercaptan, mercapto acid ester, monoester maleate, hydroxyl, oxygen, or sulfur.

The novel organotin compounds of this invention may be soluble in those general organic solvents which have a boiling point in the range of 40 to 300° C., e.g. aromatic hydrocarbons, alcohols, ethers, esters, ketones, petroleum hydrocarbons, etc.

These organotin antioxidants and stabilizers may be combined with or incorporated into the synthetic resins in several ways. For instance, the organotin compound or mixture of compounds may be added to the monomer before polymerization of or polycondensation of the synthetic resin. After the addition of the organotin compound, the admixture may be polymerized or polycondensed and molded into films, fibers, or other articles. Alternatively, the organotin compound may be added to the synthetic resin in combination with other additives such as a peroxide decomposing agent, a light stabilizer, a coloring agent, a mold lubricant, etc. by mixers, e.g. a ribbon blender, a high-speed mixer, a stirring mixer, etc. after which the mixture may be molded into films, fibers, or other articles. A preferred amount of the organotin stabilizers and antioxidants to be employed in the process of this invention is in the range of about 0.001 to 5% by weight based on the weight of the synthetic resins, which will vary depending upon the kind of molded articles and the manner in which the organotin compounds are added.

The organotin compounds of this invention are especially useful in the production of the synthetic resins when these resins are molded or polymerized at a relatively high temperature. Often conventional stabilizers and antioxidants actually stimulate the thermal decomposition of resins at temperatures above about 170° C. For example, when Y is the residue of mercaptan, mercapto acid ester, carboxylic acid or monoester maleate in general Formula I, the organotin stabilizers of the invention can also impart thermal resistance to synthetic resins which are susceptible to heat, e.g. ABS resins, chlorine-containing resins, polyolefins, etc. The low volatility of these organotin compounds make them especially useful as stabilizers in synthetic resin formulations which require heat or exposure to elevated temperature during use or during the processing of the synthetic resin material.

Specific examples of the organotin compounds which are within the scope of this invention include, among others, the following:

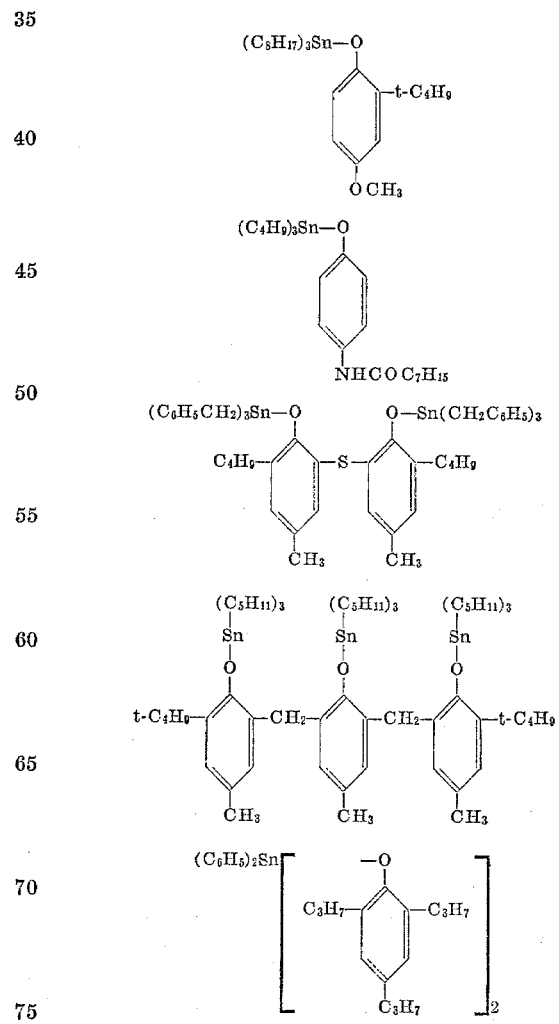

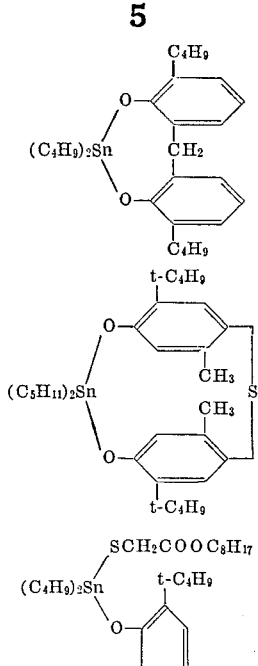
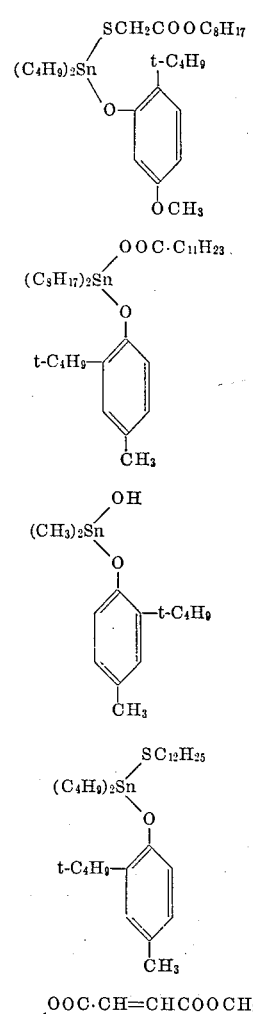
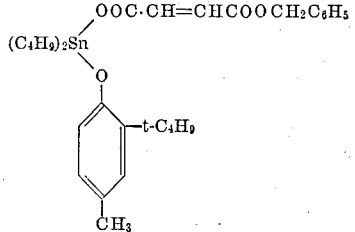
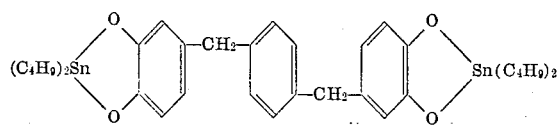

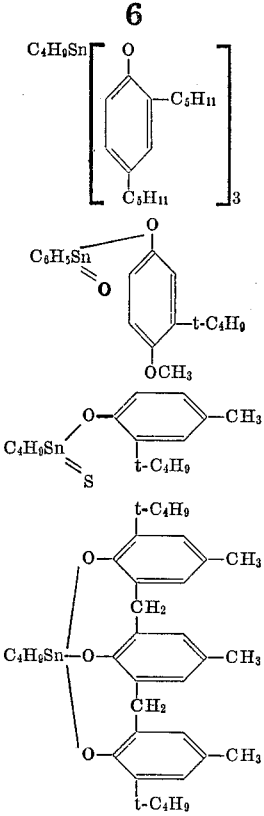
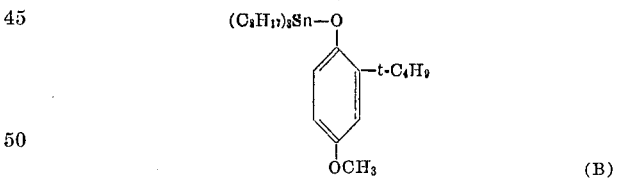

The following examples are submitted for the purpose of illustration only and are not to be construed as limiting the scope of the invention in any way.

EXAMPLE 1

One-tenth mole of 2-t-butyl-4-methoxy phenol (A) was reacted with one-tenth mole of tryoctyltin methoxide in 200 milliliters of toluene under reflux conditions for 6 hours. The solvent was then distilled off under reduced pressure to give a compound (B) of the formula:

(B)

In order to provide a comparison as to the volatility by heat of the compounds (A) and (B), the two compounds were left in a Geer oven at 180° C. for 0.5 hour and the weight losses were examined. Only 1.2% of the compound (B) disappeared compared with a 32% loss of the compound (A). The infra-red spectra of the compound (B) were practically the same before and after the heat treatment, indicating good heat stability.

Five-tenths gram of the organotin compound (B) was added as antioxidants to 100 grams of styrene, the mixture was polymerized by heating at 100° C. for 2 days, and a sheet was made from the polymer thus obtained. The degree of discoloration (as measured by the increase of yellow color of the sheet) was about 1/30 of that of the control sheet which was made by the same procedure as above but not containing any antioxidants when both were allowed to stand at room temperature for the same length of time in summer.

EXAMPLE 2

Two-tenths mole of 2-t-butyl phenol (C) was reacted with one-tenth mole of diamyltin oxide in 200 milliliters of toluene under reflux conditions for 6 hours. The toluene was then distilled off under reduced pressure to give a compound (D) of the formula:

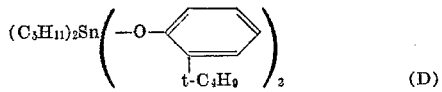 (D)

The compounds (C) and (D) were tested for volatility by the same procedure as in Example 1. The percent by weight of each compound which was lost was as follows: (C), 34.2%; (D), 2.9%.

100 milligrams of benzoyl peroxide and 0.5 gram of the organotin compound (D) were mixed together in 400 milliliters of methyl methacrylate and the solution was polymerized and molded into hard plates of 2 mm. thickness. For comparison, a plate was prepared of the same composition as above, but not containing the organotin compound (D). Both plates were placed on a black board which was set at an angle of 45° to the vertical and facing south, and exposed to the sun until they were cracked. The plate containing organotin compound (D) had to be exposed 17 times as long as the control sheet in order to crack them.

EXAMPLE 3

One-tenth mole of N-stearoyl-p-aminophenol (E) was reacted with one-tenth mole of dibutyltin oxide and one-tenth mole of dodecyl mercaptan in 200 milliliters of benzene under reflux conditions for 5 hours. The benzene was then distilled off under reduced pressure to give a compound (F) of the formula:

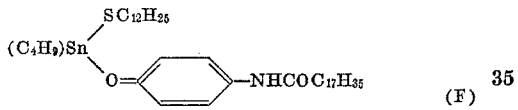 (F)

The compounds (E) and (F) were tested for volatility by the same procedure as in Example 1 giving the following percents by weight of each compound which was lost: (E), 8.2%; (F), only 0.7%.

Eight-tenths part by weight of the organotin compound (F) was added to 2,000 parts of 5% polyvinyl chloride solution in methylnaphthalene and the solution was spread out on a glass plate. The methylnaphthalene was then stripped off from said glass plate under reduced pressure at 180° C. for 10 minutes leaving a colorless, transparent thin film of polyvinyl chloride. This film was not discolored after it had been kept in a Geer oven at 160° C. for 60 minutes.

For the purposes of comparison, a film without the compound (F) and a film with 0.2 part of the compound (E) were made by the same procedure as above. The initial colors of the two films were yellow. Both films turned brown after they had been kept in a Geer oven at 160° C. only for 20 minutes.

From these tests, it was concluded that the organotin compound (F) had extremely low volatility and that it rendered the polyvinyl chloride stable to heat.

EXAMPLE 4

One-tenth mole of 2,4,6-tripropyl phenol (G) was reacted with one-tenth mole of dibutyltin dimethoxide and one-tenth mole of monobenzyl maleate in 200 milliliters of toluene under reflux conditions. The solvent was then distilled off under reduced pressure to give a compound (H) of the formula:

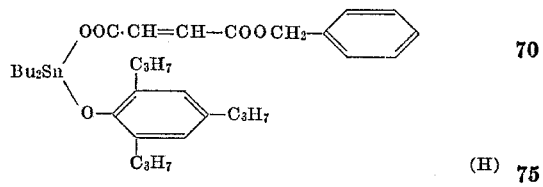 (H)

The compounds (G) and (H) were tested for volatility by the same procedure as in Example 1 and gave the following results (percent by weight of each compound lost): (G), 15%; (H), 2.0%.

Three parts of dibutyltin-bis-(benzyl maleate) as a stabilizer, 1 part of dibutyltin dilaurate as a lubricant, and 0.6 part of the compound (H) were mixed together thoroughly with 100 parts of vinyl chloride resin. The mixture was sheeted on a mixing mill heated at a surface temperature of 180° C. The sheet obtained was colorless and transparent, and give no coloration after exposure to the sun over a long period of 32 consecutive months.

For the purposes of comparison, a sheet was prepared of the same composition as above, but not containing either of the compounds (G) or (H). Another sheet was prepared containing 1 part of the compound 2,4,6-tripropyl phenol (G) in place of the organotin compound (H) in the same manner as above. These sheets were colorless and transparent, and both, which were placed on a black board that was set at an angle of 45° to the vertical and facing south, were not discolored after exposure to the sun for 22 consecutive months.

EXAMPLE 5

One-tenth mole of 2,2'-thio bis-4,4'-methyl-6,6'-t-butyl phenol (I) was reacted with one-tenth mole of monobutyltin oxide and one-tenth mole of dodecyl mercaptan in 200 milliliters of toluene under reflux conditions for 6 hours. The toluene was then distilled off under reduced pressure to give a compound (J) of the formula:

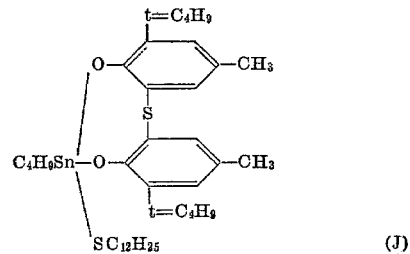 (J)

The compounds (I) and (J) were tested for volatility by the same procedure as in Example 1 and gave the following results (percent by weight of each compound lost): (I), 4.2%; (J), only 0.8%.

An amount of each of compounds (I) and (J) was added to separate samples of acrylonitrile-butadiene-styrene terpolymer resins to give a concentration of 0.5 percent by weight of each compound based upon the total weight of the resin and the mixtures were injection molded into flat plates. The plate containing the compound (I) was yellow in color when formed, but the plate containing the organotin compound (J) was white in color. From these results it was concluded that the compound (I) accelerated the thermal decomposition of the ABS resin whereas compound (J) did not. When these plates were brought into contact with oxygen at room temperature, the plate containing the compound 2,2'-thio bis-4,4'-methyl-6,6'-t-butyl phenol (I) was cracked 9–11 times as fast as the plate containing the organotin compound (J).

EXAMPLE 6

One-tenth mole of 4-hydroxy-3,5-bis(2-hydroxy-3-t-butyl-5-methyl) benzyl toluene (K) was reacted with one-tenth mole of monooctyltin oxide in 600 milliliters of hexane under reflux conditions for 4 hours. The hexane was then distilled off under reduced pressure to give a compound (L) of the formula:

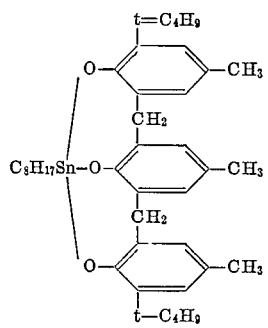
(L)

The compounds (K) and (L) were tested for volatility by the same procedure as in Example 1 and gave the following results (percent by weight of compounds lost): (K), 0.9%; (L), 0.07%.

An amount of the compound (L) sufficient to give a 1.5 percent by weight concentration was added to polyethylene, and the mixture was extruded into a film of 0.6 mm. thickness. For comparison, a film was prepared from polyethylene containing 1.5% by weight of the compound (K) in place of the organotin compound (L) by the same technique, and another film without any additives was made. All three films were colorless. These films were left in a Geer oven at 130° C. for 100 consecutive hours in order to test them for resistance to oxidative degradation. The polyethylene film containing the organotin compound (L) was not deteriorated by this test whereas both the film containing the compound (K) and the film without any additives became very fragile.

Although this invention has been illustrated by reference to specific examples, numerous changes and modifications thereof which clearly fall within the scope of the invention will be apparent to those skilled in the art.

We claim:
1. A compound of the formula:

(I)          $[R_mSn]_a[X]_b[Y]_c$ wherein:

(a) R is selected from the group consisting of alkyl of 1–18 carbon atoms, cycloalkyl, aryl, and benzyl;
(b) $m$, $a$, and $b$ are each an integer 1–3, $c$ is an integer 0–2;
(c) Y is selected from the group consisting of the residue of a carboxylic acid of 1–18 carbon atoms, mercaptan, mercapto acid ester, monoester maleate, an oxygen atom in which $c$ is 1, and a sulfur atom in which $c$ is 1; and
(d) X is a residue of a compound of the formula:

(II)
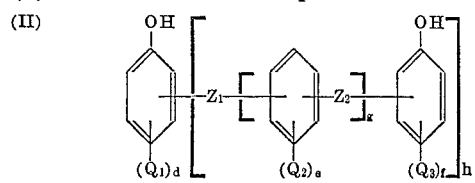

wherein:

(1) $Q_1$, $Q_2$, and $Q_3$ may be the same or different and are each selected from the group consisting of alkyl of 1–12 carbon atoms,

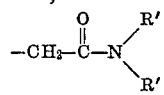

wherein R' is alkyl of 1–18 carbon atoms,

—NHCOR' wherein R' is as defined above, and

—CH$_2$CH$_2$COOR' wherein R' is as defined above (in which said hydroxyl groups may be attached to the tin atom via the hydroxyl-oxygen atom by removal of the hydrogen atom from said group), at least one of each of $Q_1$ and $Q_3$ being attached in the ortho position to the respective phenolic hydroxyls when $Q_1$ and $Q_3$ are alkyl of 1–12 carbon atoms;

(2) $d$, $e$, and $f$ are each an integer 1–3, $g$ is an integer 0–3, $h$ is an integer 0–1;
(3) each of $Z_1$ and $Z_2$ is independently selected from the group consisting of sulfur, oxygen, and alkylene of 1–4 carbon atoms;
(4) when $d$, $e$, and $f$ are each 2 or 3, each of $Q_1$, $Q_2$, and $Q_3$ may be the same or different; and
(5) all unsubstituted valences of the atoms in Formula II are bonded to hydrogen atoms.

2. A compound according to claim 1 wherein $c$ is 0, R is an alkyl group of 1–18 carbon atoms, and X is a residue of a compound of the formula:

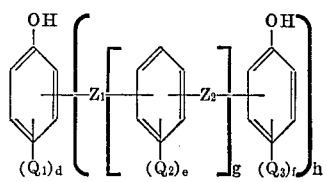

wherein each of $Q_1$, $Q_2$, and $Q_3$ is an alkyl group of 1–12 carbon atoms, and each of $Z_1$ and $Z_2$ is an alkylene group of 1–4 carbon atoms, at least one of each of $Q_1$ and $Q_3$ being attached in the ortho position to the respective phenolic hydroxyls.

3. The compound:

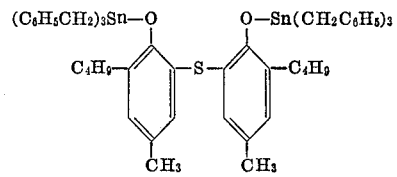

4. The compound:

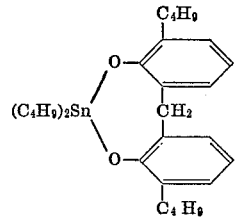

5. The compound:

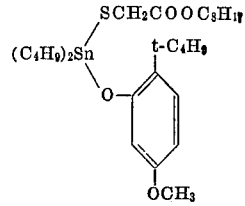

6. The compound:

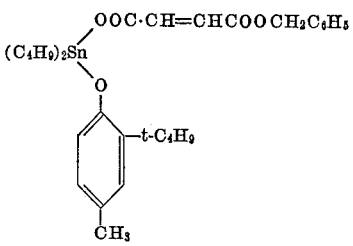

7. The compound:

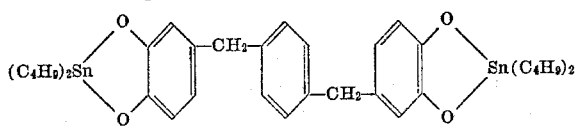

8. The compound:

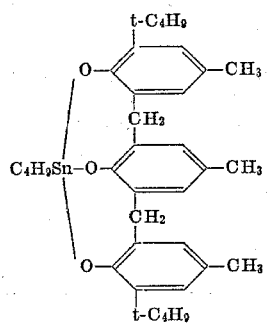

9. The compound:

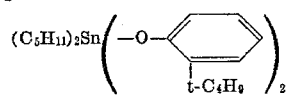

10. The compound:

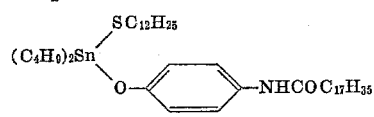

11. The compound:

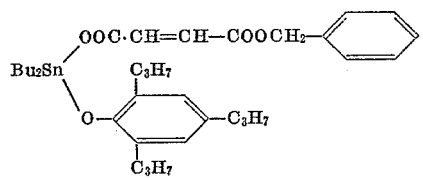

12. The compound:

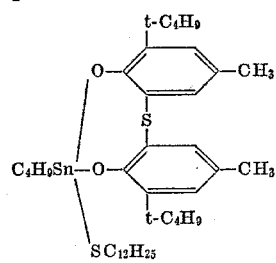

13. The compound:

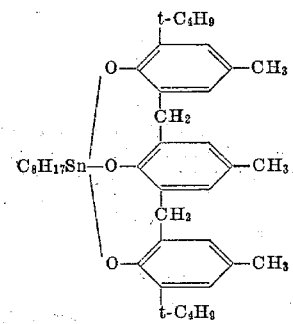

References Cited
UNITED STATES PATENTS

| | | | |
|---|---|---|---|
| 3,117,146 | 1/1964 | Zweigle et al. | 260—429.7 |
| 3,290,247 | 12/1966 | Wilson et al. | 260—429.7 X |
| 2,720,507 | 10/1955 | Caldwell | 260—429.7 X |
| 2,789,105 | 4/1957 | Tomka | 260—429.7 X |
| 2,831,898 | 4/1958 | Ecke et al. | 260—429.7 X |
| 3,038,877 | 6/1962 | Harrington et al. | 260—429.7 X |
| 3,208,970 | 9/1965 | Tazewell et al. | 260—429.7 |
| 2,346,826 | 4/1944 | Cook et al. | 260—429.7 X |
| 2,581,931 | 1/1952 | Albert | 260—429.7 X |
| 2,684,973 | 7/1954 | Mack et al. | 260—429.7 |
| 2,715,111 | 8/1955 | Weinberg | 260—429.7 X |
| 2,798,862 | 7/1957 | Tomka et al. | 260—45.75 |
| 2,998,441 | 8/1961 | Mack et al. | 260—429.7 |
| 3,099,668 | 7/1963 | Zweigle et al. | 260—429.7 |
| 3,113,144 | 12/1963 | Zweigle | 260—429.7 |
| 3,129,236 | 4/1964 | Weissenberger | 260—429.7 |
| 3,221,036 | 11/1965 | Weissenberger | 260—429.7 |
| 3,214,453 | 10/1965 | Stern | 260—429.7 |
| 3,221,036 | 11/1965 | Weissenberger | 260—429.7 |

OTHER REFERENCES

Aravamudan: Chem. Abstracts, vol. 63 (1965), pp. 18137–18138.

Smetana: Chemical Abstracts, vol. 54 (1960), p. 25546(f).

Dunbar: Chemical Abstracts, vol. 54 (1960), p. 15282(i).

TOBIAS E. LEVOW, Primary Examiner

W. F. W. BELLAMY, Assistant Examiner

U.S. Cl. X.R.
260—45.75, 429.7